United States Patent [19]

Hirayama et al.

[11] Patent Number: 4,956,227
[45] Date of Patent: Sep. 11, 1990

[54] LAMINATED STRUCTURE

[75] Inventors: Naoto Hirayama, Takarazuka; Yuichi Aoki, Ibaraki; Akio Takigawa, Nishinomiya; Motoaki Yoshida, Kawanishi; Yasunori Shiraishi, Kawasaki, all of Japan

[73] Assignee: Nippon Sheet Glass Co., Ltd., Osaka, Japan

[21] Appl. No.: 271,889

[22] Filed: Nov. 16, 1988

[51] Int. Cl.$^5$ .................. B32B 27/36; B32B 13/12; B32B 27/38
[52] U.S. Cl. .................. 428/331; 428/323; 428/328; 428/447; 428/414; 428/437; 428/425.5; 428/425.6; 428/483
[58] Field of Search .......... 428/415, 431, 447, 451, 428/437, 483, 331

[56] References Cited

U.S. PATENT DOCUMENTS

| | | | |
|---|---|---|---|
| 4,121,014 | 10/1978 | Shaffer | 428/415 X |
| 4,242,403 | 12/1980 | Mattimoe et al. | 428/437 X |
| 4,469,743 | 9/1984 | Hiss | 428/451 X |

FOREIGN PATENT DOCUMENTS 1394271  4/1972  United Kingdom .

Primary Examiner—George F. Lesmes
Assistant Examiner—Elizabeth M. Cole
Attorney, Agent, or Firm—Wenderoth, Lind & Ponack

[57] ABSTRACT

A laminated structure composed of (A) a layer comprising a polyester resin, (B) a layer comprising a cured (meth)acrylate polymer containing an epoxy group in the molecule, and (C) a layer comprising a cured organopolysiloxane compound, the layers (A), (B) and (C) being laminated in this sequence. The laminated structure is suitable for use in a safety glass, for example.

16 Claims, No Drawings

LAMINATED STRUCTURE

BACKGROUND OF THE INVENTION

1. Field of the Invention

This invention relates to a safety glass composed of a layer of glass and a layer of a plastic used, for example, as an automobile windshield or a windowpane of a building, and to a laminated structure useful for it.

2. Description of the Prior Art

A safety glass (laminated glass) composed of a three layer structure of glass-plastic-glass has previously been used in applications requiring safety, for example as an automobile windshield glass The plastic layer in this structure is provided for the purpose of preventing scattering of glass fragments and penetration of a colliding object in the event of glass shattering. When, for example, a human body collides with this laminated structure, the shattered glass fragments will not scatter, but rather it is impossible to prevent laceration by sharp glass fragments In recent years, attempts have been made to provide a further plastic layer for prevention of laceration on an indoor side of the three layer structure. This structure is composed of four layers of glass-plastic-glass-plastic. If the outermost plastic layer on the indoor side is composed of a material having penetration resistance and being capable of preventing glass scattering and laceration, a two-layer structure composed of glass and plastic will suffice The following two techniques have previously been proposed in regard to a windshield of this two-layer structure.

Japanese Patent Publication No. 27050/1982 discloses a structure composed of glass, an impact absorbing layer of a plastic material (mainly polyurethane) on it, and a protective layer thereon composed of a partially crosslinked aliphatic polyurethane.

Japanese Laid-Open Patent Publication No. 51339/1986 describes a laminated structure produced by successively laminating (a) an impact-absorbing layer of 0.3 to 2.0 mm in thickness of polyurethane or polyvinyl butyral as a main component, and (b) a layer with a thickness of 50 to 200 micrometers of a polyester as a main component on a glass sheet.

The structure described in the above-cited Japanese Patent Publication has the following problems. The partially-crosslinked polyurethane layer as the outermost layer on the indoor side does not have sufficient chemical resistance, soiling resistance and laceration resistance. Since it is a crosslinked structure, its flexibility is greatly reduced. Injuring at the time of stuffing, etc. may be prevented to some extent since it has rubbery elasticity, but after repeated rubbing, this polyurethane layer is susceptible to injury. The crosslinking density of the surface having rubbery elasticity cannot be increased to such an extent that penetration of chemicals such as organic solvents or soiling is prevented. Yellowing due to contact of a tobacco smoke or swelling owing to label application on such a surface cannot be prevented, and the structure has a short service life.

The laminate described in Japanese Laid-Open Patent Publication No. 51339/1986 does not substantially have sufficient resistance to laceration.

Generally, a biaxially stretched polyester film is widely used as a transparent material or the like because it has superior mechanical properties and transparency. But it has poor abrasion resistance and is susceptible to injury on the surface. In order to remove these defects, it was proposed to coat the film with a thermosetting resin.

For example, Japanese Patent Publication No. 53703/1985 discloses a scratch-resistant laminate obtained by applying a primer layer of a polyester resin on an article of polyethylene terephthalate, coating a top coat paint comprising a vinyl polymer containing a melamine group-containing (meth)acrylate as a main ingredient.

Japanese Patent Publication No. 43303/1985 discloses an abrasion-resistant laminate obtained by applying a resin composition comprising a vinyl pyrrolidone/acrylate copolymer and a quaternary ammonium salt polymer as a primer layer to a polyester polymer, then coating on it a top coat paint composed of colloidal silica and a hydrolyzate of an alkoxysilane having an epoxy group, and curing the top coat paint.

The laminated structure disclosed in Japanese Patent Publication No. 53703/1985 does not have a fully satisfactory hardness In the laminated structure disclosed in Japanese Patent Publication No. 43303/1985, the hardness and adhesion of the top coat layer tend to be reduced upon immersion in boiling water.

SUMMARY OF THE INVENTION

The present inventors made extensive investigation with a view to providing a polyester resin laminated structure which is free from these defects, has improved abrasion resistance, adhesion and water resistance, and is useful in a safety glass, etc. These investigations have led to the discovery that a polyester-type laminated structure having improved abrasion resistance, water resistance and weatherability can be obtained by coating a polyester resin substrate with a specific organic polymer to form a primer layer, and thus improve the adhesion of a composition comprising a silicon resin and optionally particles of an inorganic compound as a main ingredient to the substrate, and coating this composition on the primer layer and curing it.

DETAILED DESCRIPTION OF THE INVENTION

According to this invention, there is provided a laminated structure composed of (A) a layer comprising a polyester resin, (B) a layer comprising a cured (meth)acrylate polymer containing an epoxy group in the molecule, and (C) a layer comprising a cured organopolysiloxane compound and optionally particles of an inorganic compound, the layers (A), (B) and (C) being laminated in this sequence.

A polyester film is suitably used as the layer of the polyester resin constituting the laminated structure of the present invention The polyester film is selected for its thermal, mechanical and optical properties. A biaxially stretched polyethylene terephthalate film having a thickness of 10 to 500 micrometers is preferred. It is further necessary for the polyester film to have a haze lower than 1.0, and surface uniformity. Desirably, the polyester film is dimensionally stabilized by heating under tension and the treating temperature should be below the temperature at which the film is intended to be used.

Examples of the transparent polyester film having a thickness of 10 to 500 micrometers used in this invention are films of saturated polyesters such as a polyethylene terephthalate film or a polybutylene terephthalate film.

The polymer of a (meth)acrylate having an epoxy group in the molecule in the layer (B) (primer layer) constituting the laminated structure of the present invention is preferably a copolymer of (i) 1 to 100 mole %, preferably 30 to 95 mole more preferably 40 to 90 mole %, of an ester of an aliphatic alcohol having 1 to 6 carbon atoms and an epoxy group in the molecule and (meth)acrylic acid, and (ii) 99 to 0 mole %, preferably 70 to 5 mole %, more preferably 60 to 10 mole %, of an ester of an aliphatic alcohol having no epoxy group in the molecule and having 1 to 6 carbon atoms which may optionally have a substituent and (meth)acrylic acid.

Examples of the ester of the aliphatic alcohol having 1 to 6 carbon atoms and (meth)acrylic acid are glycidyl acrylate and glycidyl methacrylate. Glycidyl methacrylate is preferred.

Examples of the ester of a $C_1$-$C_6$ aliphatic alcohol having no epoxy group in the molecule and optionally having a substituent with (meth)acrylic acid include methyl (meth)acrylate, ethyl (meth)acrylate, propyl (meth)acrylate, butyl (meth)acrylate, hydroxyethyl (meth)acrylate, hydroxypropyl (meth)acrylate, butylene glycol mono(meth)acrylate, glycerol mono(meth)acrylate, polyethylene glycol mono(meth)acrylate, polypropylene glycol mono(meth)acrylate, gamma-(meth)acryloxypropyltriethoxysilane, gamma-(meth)acryloxypropylbutyldimethoxysilane, gamma-(meth)acryloxypropylmethyldiethoxysilane, dimethylaminoethyl (meth)acrylate, diethylaminoethyl (meth)acrylate, diethylaminoethyl (meth)acrylate, dibutylaminoethyl (meth)acrylate, dimethylaminopropyl (meth)acrylate, diethylaminopropyl (meth)acrylate, and dibutylaminopropyl (meth)acrylate. Of these, the methacrylic esters are prefererd.

The layer (B) constituting the laminated structure of the invention may contain a polymer of an ester of a $C_1$-$C_6$ aliphatic alcohol substituted by a hydroxyl group with (meth)acrylic acid in addition to the polymer of the (meth)acrylate having an epoxy group in the molecule. Examples of the hydroxyl-containing ester used to prepare such an additional polymer are hydroxyethyl (meth)acrylate, hydroxypropyl (meth)acrylate, butylene glycol (meth)acrylate and glycerol mono(meth)acrylate.

The layer (B) may, as required, further contain various additives such as ultraviolet absorbers, antioxidants, photostabilizers, curing catalysts, crosslinking agents, dyes, photochromic dyes and thermochromic dyes.

Examples of the ultraviolet absorbers include benzophenones such as 2-hydroxy-4-methoxybenzophenone, 2-hydroxy-4-octoxybenzophenone, 2,4-dihydroxybenzophenone and 2,2'-dihydroxy-4-methoxybenzophenone; benzotriazoles such as 2-(2'-hydroxy-5'-methylphenyl)benzotriazole, 2-(2'-hydroxy-5'-t-butylphenyl)benzotriazole, 2-(2'-hydroxy-5'-octylphenyl)benzotriazole, 2-(2'-hydroxy-3', 5'-di-t-butylphenyl)benzotriazole and 2-(2'-hydroxy-di-butylphenyl)-5-chlorobenzotriazole; and cyanoacrylates such as ethyl-2-cyano-3,3'-diphenylacrylate.

Examples of the antioxidants include 2,6-di-tert-butyl-p-cresol, 2- or 3-tert-butyl-4-methoxyphenol, stearyl-beta-(3,5-di-tert-butyl-4-hydroxyphenyl) propionate, 2,2'-methylenebis-(4-methyl-6-tert-butylphenol),4,4'-thiobis-(3-methyl-6-tert-butylphenol), 4,4'-butylidene-bis-(3-methyl-6-tert-butylphenol), 1,1,3-tris- (2-methyl-4-hydroxy-5-tert-butylphenyl)butane, 1,3,5-trimethyl-2,4,6-tris(3,5-di-tert-butyl-4hydroxybenzyl)-benzene, tetrakis-[methylene-3-(3', 5'-di-tert-butyl-4'-hydroxyphenyl)propionate)methane, dilauryl thiodipropionate, dimyristyl thiodipropionate, triphenyl phosphite, diphenylisodecyl phosphite, phenyldiisodecylphosphite, 4,4'-butylidene-bis-(3-methyl-6-tert-butylphenyl-di-tridecyl)phosphite and tris(nonylphenyl)phosphite.

Examples of the curing catalysts are hydrochloric acid, ammonium chloride, ammonium nitrate, ammonium thiocyanate, ammonium perchlorate, dimethylaminoethylamine, methylaminopropylamine, diethylaminoethylamine, diethylaminopropylamine, dipropylaminopropylamine, triethylatetramine, piperazine and N-(2-aminoethyl)piperazine. The amount of such a curing catalyst used is generally 0.03 to 10by weight based on the resin. Examples of the curing agents are various epoxy resins derived from triglycidyl tris(2-hydroxyethyl)isocyanate, resorcinol diglycidyl ether, and bisphenols such as bisphenol A diglycidyl ether and bisphenol S diglycidyl ether. The suitable amount of the crosslinking agents is generally 1 to 50by weight based on the resin solids.

The layer B has a thickness of preferably 0.05 to 10 microns, more preferably 0.1 to 1.0 micron. If its thickness is less than 0.05 micron, the adhesion of the layer B is reduced. If it is larger than 10 microns, the coated layer B may become hazy or undergoes cracking. The organopolysiloxane compound of the layer C (hard coat layer) constituting the laminated structure of the invention is preferably a hydrolyzed and condensed product of a silicon compound represented by the following formula

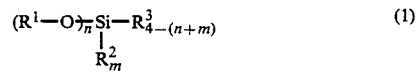

wherein $R^1$ represents an alkyl or alkoxyalkyl group having 1 to 6 carbon atoms, $R^2$ represents an alkyl group having 1 to 6 carbon atoms, $R^3$ represents an alkyl group having 1 to 6 carbon atoms or a cycloalkyl group having 3 to 6 carbon atoms which may optionally be substituted by a substituent selected from the group consisting of an epoxy group, a glycidyloxy group, a (meth)acryloyl group, a vinyl group, an allyl group, a mercapto group, an epoxy-substituted cycloalkyl group, a halogen atom, an amino group and an amide group, n is 2, 3 or 4, and m is 0 or 1, provided that $n+m \leq 4$, or a mixture of at least two of the above hydrolyzed and condensed products.

Preferred silicon compounds of formula (1) are glycidoxyalkyltrialkoxysilanes in which the alkyl moiety and the alkoxy moiety each have 1 to 4 carbon atoms.

Another preferred group of the silicon compounds of formula (1) are alkyltrialkoxysilanes in which the alkyl moiety and the alkoxy moiety each have 1 to 4 carbon atoms.

More preferably, the organopolysiloxane compound of the layer C constituting the laminated structure of the invention is a mixture of (i) 5 to 99by weight, preferably 15 to 90by weight, more preferably 25 to 80by weight, of a hydrolyzed and condensed product of a glycidoxyalkyltrialkoxysilane in which the alkyl moiety and the alkoxy moiety each have 1 to 4 carbon atoms, and (ii) 95 to 1by weight, preferably 85 to 10by weight, more preferably 75 to 20by weight, of a hydrolyzed and condensed product of an alkyltrialkoxysilane in which the alkyl moiety and the alkoxy moiety each have 1 to 4 carbon atoms, the amounts being based on the total weight of (i) and If the amount of the hydrolyzed and condensed product of the glycidoxyalkyltrialkoxysilane is larger than 90% by weight, the flexural property of the hard coat layer is good but its weatherabilty is reduced undesirably. On the other hand, if the amount of the hydrolyzed and condensed product of the alkyltrialkoxysilane exceeds 85by weight, the weatherability of the hard coat layer is good, but its flexural property is undesirably reduced.

Preferred among the silicon compounds of formula (1) are gamma-glycidoxypropyltrialkoxysilanes, gamma-glycidoxypropylmethyldialkoxysilanes, alkyltrialkoxysilanes, dialkyldialkoxysilanes and 2-(3,4-epoxycyclohexyl)ethyltrialkoxysilanes.

Specific examples of the silicon compounds of formula (1) include dimethyldimethoxysilane, methyltrimethoxysilane, tetramethoxysilane, tetraethoxysilane, tetrapropoxysilane, vinyltriethoxysilane, vinyltris(beta-methoxyethoxy)silane, vinyltriacetoxysilane, gamma-methacryloxypropyltrimethoxysilane, gamma-aminopropyltriethoxysilane, N-(beta-aminoethyl)-gamma-aminopropyltrimethoxysilane, N-bis(beta-hydroxyethyl)-gamma-aminopropyltrimethoxysilane, N-(beta-aminoethyl)-gamma-aminopropyl(methyl)dimethoxysilane, gamma-chloropropyltrimethoxysilane, gamma-mercaptopropyltrimethoxysilane, 3,3,3-trifluoropropyltrimethoxysilane, N-(3-triethoxysilylpropyl)urea, and s-N-alpha-phenethyl-N'-trimethoxysilylpropylurea.

The hydrolyzed and condensed product of the silicon compound of formula (1) constituting the layer C in this invention can be obtained, for example, by heating the silicon compound of formula (1) in a mixed solvent such as water and an alcohol in the presence of an acid. The alkoxy groups or the alkoxyalkyl groups in the silicon compound are partly or wholly hydrolyzed to hydroxyl groups, and the hydroxyl groups are at least partly condensed with each other. If the silicon compound of formula (1) is used without hydrolysis, the resulting cured coating is whitened and has insuffient abrasion resistance When two or more hydrolyzed and condensed products of silicon compounds of formula (1) are used, good results are obtained more frequently by hydrolyzing the silicon compounds simultaneously than by separately hydrolyzing them and mixing the hydrolyzed products later. Preferably, the hydrolysis is carried out in the presence of particles of an inorganic compound.

In order to improve the durability (cracking resistance) of the layer C of the laminated structure of the invention, the layer C preferably further contains particles of an inorganic compound in an amount of less than 60by weight, preferably 5 to 45by weight, based on the total amount of the organopolysiloxane compound and the inorganic compound.

Examples of the inorganic compound particles are fine particles preferably having an average particle diameter of 1 to 200 nm of $SiO_2$, $Al_2O_3$, $ZrO_2$, $TiO_2$, $Sb_2O_5$, $SnO_2$, $Yb_2O_3$, $Yb_2O_5$, $Ta_2O_3$, $Y_2O_3$, and $Ce_2O_3$, and colloidal dispersions of these particles in water or organic solvents. Among these, ultrafine particles of silica and colloidal silica are preferred.

The layer C of the laminated structure of the invention may, as required, contain various additives such as ultraviolet absorbers, antioxidants, curing agents, dyes, photochromic dyes and thermochromic dyes.

The ultraviolet absorbers and antioxidants used in the layer C may be the same as those exemplified above with regard to the layer B.

Examples of the curing agents which may optionally be incorporated in the layer C include ammonium perchlorate, ammonium nitrate, ammonium chloride, ammonium sulfate, ammonium thiocyanate, perchloric acid, hydrochloric acid, nitric acid, phosphoric acid, sulfuric acid, sulfonic acid, p-toluenesulfonic acid, boron trifluoride, and a complex of boron trifluoride with an electron donor; Lewis acids such as $SnCl_4$, $ZnCl_3$, $FECl_3$, $AlCl_3$, $SbCl_5$ and $TiCl_4$ and complexes of these; organic acid metal salts such as sodium acetate, zinc naphthenate, cobalt naphthenate, zinc octylate and tin octylate; metal borofluorides such as zinc borofluoride and tin borofluoride; organic esters of boric acid such as ethyl borate and methyl borate; alkalies such as sodium hydroxide and potassium hydroxide; titanate esters such as tetrabutoxy titanium and tetraisopropoxytitanium; metal acetyl acetonates such as chromium acetylacetonate, titanyl acetylacetonate, aluminum acetylacetonate, cobalt acetylacetonate and nickel acetylacetonate; amines such as n-butylamine, di-n-butylamine, tri-n-butylamine, guanidine, biguanide and imidazole; highly fluorinated aliphatic sulfonic acid salts such as ammonium trifluoromethylsulfonate and sodium trifluoromethylsulfonate; and highly fluorinated aliphatic sulfonyl compounds such as $NH_4(CF_3SO_2)_2C.Br$, $K(CF_3SO_2)CH$ and $Ba(CF_3SO_2)_2CH]_2$.

Of these curing agents, perchlorates, hydrochlorides, sulfates, carboxylates, highly fluorinated aliphatic sulfonic acid salts and highly fluorinated aliphatic sulfonyl compounds typified by ammonium perchlorate, ammonium chloride, ammonium sulfate, ammonium nitrate, sodium acetate, ammonium trifluoromethylsulfonate and bis(trifluoromethylsulfonyl)bromomethyl ammonium are suitable.

The amount of the curing agent incorporated is 0.05 to 10by weight, preferably 0.1 to 5by weight, based on the organopolysiloxane compound.

The layer C constituting the laminated structure of the invention has a thickness of preferably 0.1 to 30 microns, more preferably 1 to 30 microns, most preferably 1 to 10 microns. If its thickness is less than 0.1 micron, the abrasion resistance of the layer C is insufficient. If, on the other hand, it exceeds 30 microns, cracks tend to occur in the layer C.

The laminated structure of the invention composed of the layer A, the layer B (to be sometimes referred to as the primer layer) and the layer C (to be sometimes referred to as the hard coat layer) can be produced, for example, by the following method.

First, a primer coating liquid composition is prepared by adding the polymer of the (meth)acrylate containing an epoxy group in the molecule and as an optional component, the polymer of an ester of an aliphatic alcohol having 1 to 6 carbon atoms substituted by a hydroxyl group with (meth)acrylic acid and as required such additives as exemplified hereinabove to a suitable solvent such as ethyl Cellosolve. The primer coating liquid composition is coated on one surface of a polyester sheet optionally subjected to plasma treatment, flame treatment or corona discharge treatment, and then baked (cured) at a temperature lower than the heat distortion temperature of the polyester sheet to give a laminated structure composed of the layers A and B.

Then, the silicon compond of formula (1) is mixed with dilute hydrochloric acid optionally in the presence of colloidal silica and heat-treated. To the resulting hydrolyzed and condensed silicon compound optionally containing silica are added a suitable solvent such as ethyl Cellosolve and as required, such additives as exemplified hereinabove to prepare a hard coat liquid composition. The hard coat liquid composition is coated on the layer B of the laminated structure composed of the layers A and B by a doctor blade method, a flow coat method or a spray method, and then baked (cured) at a temperature of at least 70° C. but lower than the heat distortion temperature of the polyester sheet for a period of 10 seconds to 1 hour to give a three-layer laminated structure composed of the layers A, B and C.

When the three-layer laminated structure of the invention is immersed in boiling water, the hardness and adhesion of the hard-coated layer are not reduced, and the hard coat layer has good weatherability and flexural property.

According to this invention, there is also provided a 4-layer laminated structure composed of (A) a layer comprising a polyester resin,
(B) a layer comprising a cured polymer of a (meth)acrylic acid ester having an epoxy group in the molecule,
(C) a layer comprising a cured organopolysiloxane, and
(D) a shock-absorbing layer, the layers D, A, B and C being laminated in this sequence.

The layers A, B and C constituting the 4-layer laminated structure of the invention are as described above with regard to the 3-layer laminated structure.

The shock-absorbing layer (D) in the 4-layer laminated structure of the invention preferably comprises a polyvinyl butyral resin or a polyurethane resin.

The starting polyisocyanate for preparing the polyurethane resin used in the layer D is preferably non-yellowing. Examples of the non-yellowing polyisocyanate include 1,6-hexamethylene diisocyanate, isocyanate include 1,6-hexamethylene diisocyanate, isophorone diisocyanate, xylylene diisocyanate, hydrogenated 4,4'-diphenylmethane diisocyanate, lysine diisocyanate, cyclohexane 1,4-diisocyanate, 1,6,11-undecanetriisocyanate, 1,8-diisocyanato-4-isocyanatemethyloctane, lysine ester triisocyanate, 1,3,6-hexamethylene triisocyanate and bicycloheptane triisocyanate. These are generally used as prepolymers obtained by preliminary reaction with glycols or triols. Preferably, the glycols or triols are polymerized to a certain extent in order to produce polyurethanes having good shock-absorbing property. Preferably, they are used in the form of polymer polyols having hydroxyl groups at both ends. Polyesters, polyethers and polycarbonates having hydroxyl groups at both ends, and polymers of acrylic acid or methacrylic acid containing hydroxyl groups in the molecules may be used as such polymer polyols. Low-molecular-weight glycols or triols are used jointly as chain-extenders.

The prepolymers obtained by reaction of an isocyanate with a diol, after mixing it with a low-molecular-weight diol or triol as a curing agent, is coated on a substrate or cast in a mold and cured. Diamines may also be used as the curing agent. A curing catalyst, for example an organo-metallic compound such as dibutyltin dilaurate or lead octenate, may also be added.

It is also possible to prepare an isocyanate-terminated polyurethane prepolymer using the excess of an isocyanate, react it with a compound having a polymerizable double bond capable of reacting with the isocyanate, such as hydroxyethyl acrylate, to introduce a double bond into the molecular ends, optionally add a polyfunctional acrylate ester such as pentaerythritol tetraacrylate or an acrylic ester such as 2-ethylhexyl acrylate, and phocure the product in the presence of a light sensitizer. There may also be available a method in which the polyurethane prepolymer is allylated at the ends by using allyl alcohol, and the allylated prepolymer is crosslinked with a polyvalent thiol such as trimethylolpropane trismercaptoacetate. These methods may be selected according to the use of the final laminated structure.

The polyvinyl butyral used in the layer D constituting the 4-layer laminated structure of the invention may suitably be polyvinyl butyral commercially available as an interlayer of a safety glass or a laminated glass.

The shock-absorbing layer D may, as required, further contain various additives such as ultraviolet absorbers, antioxidants, photostabilizers, photochromic dyes, thermochromic dyes and plasticizers.

The layer D has a thickness of preferably 0.1 to 2.0 mm, more preferably 0.3 to 1.0 mm.

The 4-layer laminated structure of the invention may be produced, for example, by placing the 3-layer laminated structure of the layers A, B and C produced as described above on a stainless steel plate having a smooth surface so that the C layer (hard coated layer) is kept in intimate contact with the stainless steel plate and fixed there, providing a spacer around the laminated structure, casting a separately prepared urethane resin composition onto the laminated structure, placing a stainless steel plate coated with a silicone releasing agent on the laminated structure, and allowing the assembly to stand. After the urethane resin composition is cured, the upper and lower stainless steel plates and the spacer are removed. Thus, the four-layer laminated structure of the invention is obtained.

When the polyvinyl butyral resin is used, the 4-layer laminated structure of the invention can be obtained by bringing a commercial embossed film of polyvinyl butyral into contact with the layer A of the 3-layer laminated structure composed of the layers A, B and C, and bonding the assembly under heat and pressure.

When a glass layer is laminated further to the layer D in the 4-layer laminated structure of the invention, a safety glass can be obtained in which even after immersion in boiling water, the hardness and adhesion of the hard-coated layer A are not reduced, and the hard-coated layer has good weatherability and flexural property.

Thus, according to this invention, there is also provided a 5-layer laminated structure composed of (A) a layer comprising a polyester resin,
(B) a layer comprising a cured polymer of a (meth)acrylic acid ester having an epoxy group in the molecule,
(C) a layer comprising a cured organopolysiloxane,
(D) a shock-absorbing layer, and
(E) a layer of glass, the layers E, D, A, B and C being laminated in this sequence.

The layers A, B, C and D in this 5-layer laminated structure are the same as described above with regard to the 4-layer laminated structure of the present invention.

The glass layer E constituting the 5-layer laminated structure of the invention is preferably a single glass sheet or a laminated glass sheet. The single glass sheet may be, for example, a sheet of soda-lime-silicate glass having a thickness of 1 to 5 mm or a glass sheet obtained by thermally tempering or chemically strengthening this glass sheet. The laminated glass sheet may be, for example, a laminated glass sheet obtained by sandwiching polyvinyl butyral films between a plurality of soda-lime-silicate glass sheets each having a thickness of 1 to 3 mm, and pressing the assembly under heat.

The 5-layer laminated structure of this invention can be produced, for example, by any of the following procedures.

(1) A polyurethane resin is cast onto a hardcoated polyester film to prepare a polyester-polyurethane laminate. A glass sheet is said on the laminate and the assembly is consolidated under heat and pressure to give a 5-layer laminate.

(2) A glass sheeet is bonded by hand to the layer D of the aforesaid 4-layer laminated structure composed of the layers D (polyvinyl butyral), A, B and C. Then, the space between the layer D and the glass sheet is evacuated to increase adhesion. The assembly is then consolidated under heat and pressure in an autoclave to give a 5-layer laminated structure.

In the 5-layer laminated structure of this invention, a layer of polyurethane or polyvinyl butyral interposed between the polyester film and the glass acts as a shock-absorbing layer. When the polyurethane is used, great changes in its properties owing to foaming or heating are suppressed, and the reliability of the final product is high. Furthermore, there is no need to wash off sodium bicarbonate or to control the water content. The production process is this simplified. Since the outermost layer on the indoor side is a hard-coated polyester film, it has resistance to injury and soiling. The hard-coated layer is boned to the substrate polyester film through the acrylic resin primer having epoxy groups, and its adhesion is good. In addition, the hard-coated layer exhibits excellent performance in that its hardness and adhesion are well retained under conditions exposure to moisture.

The following examples will illustrate the present invention in more detail. All parts and percentages in these examples are by weight.

The properties of the coated film were evaluated by the following method.

Abrasion resistance

The film was rubber with a #0000 steel wool, and the extent of injury was examined. The results were evaluated as follows.

A: No injury was caused by strong rubbing
B: Slight injury was caused by strong rubbing
C: Injury was caused even by weak rubbing

Adhesion

Measured by a crosscut tape test. Eleven parallel lines were provided longitudinally and laterally at intervals of 1 mm by a knife on the surface of the coated film to form 100 square cuts. A cellophane adhesive tape was applied to the cut surface, and then peeled. The number of square cuts which remained unpeeled among 100 square cuts was counted, and defined as the adhesion.

Hot water resistance

The coated film was immersed for 1 hour in boiling water, and then its abrasion resistance and adhesion were examined.

Weatherability

The surface of the coated film was exposed to a Sunshine Weather-O-Meter at 63 ° C.±3 ° C. with showering of water for 12 minutes every hour. Four hundred hours and 1200 hours later, the appearance of the coated film was observed for occurrence of cracks.

Flexural property

The laminated structure was wound around each of various stainless steel rods of various diameters with the coated surface directed outwardly, and the flexural property of the coated film was evaluated by the diameter of a stainless steel rod with which cracks formed in the coated film. Smaller diameters show better flexural property.

EXAMPLE 1

Preparation of liquid compositions used for forming a primer layer (B):

(a) A mixture of 70 parts of glycidyl methacrylate, 30 parts of 2-hydroxyethyl methacrylate, 230 parts of ethyl Cellosolve and 0.4 part of azobisisobutyronitrile was stirred at 90 ° C. for 4 hours in an atmosphere of nitrogen to copolymerize the monomers. Then, 1094.7 parts of a solution of ethyl Cellosolve containing a small amount of dimethylaminopropylamine and a small amount of a flow control agent was added to prepare a liquid composition for forming a primer layer.

(b) A mixture of 50 parts of glycidyl methacrylate, 50 parts of 2-hydroxyethyl methacrylate, 230 parts of ethyl Cellosolve and 0.4 part of azobisisobutyronitrile was stirred at 90 ° C. for 4 hours in an atmosphere of nitrogen to copolymerize the monomers. Then, 1094.7 parts of a solution of ethyl Cellosolve containing a small amount of dimethylaminopropylamine and a small amount of a flow control agent was added to form a liquid composition for forming a primer layer.

(c) A copolymer of glycidyl methacrylate and 2-hydroxyethyl methacrylate was synthesized in the same way as in (a) above.

A mixture of 5 parts of dimethylaminoethyl methacrylate, 95 parts of 2-hydroxyethyl methacrylate, 400 parts of ethyl Cellosolve and 0.4 part of azobisisobutyronitrile was stirred at 90 ° C. for 4 hours in an atmosphere of nitrogen to copolymerize the....,.monomers.

Then, 70 parts of an ethyl Cellosolve solution of the copolymer of glycidyl methacrylate and 2hydroxyethyl methacrylate synthesized as above, 45 parts of the ethyl Cellosolve solution of the copolymer of dimethylaminoethyl methacrylate and 2-hydroxyethyl methacrylate synthesized above, and 884 parts of an ethyl Cellosolve solution containing a small amount of a flow control agent were mixed to form a liquid composition for forming a primer layer.

(d) A mixture of 70 parts of methyl methacrylate, 30 parts of 2-hydroxyethyl methacrylate, 400 parts of ethyl Cellosolve and 0.4 part of azobisisobutyronitrile was stirred at 90 ° C. for 4 hours in an atmosphere of nitrogen to copolymerize the monomers. Then, 884 parts of an ethyl Cellosolve solution containing a flow control agent was mixed to form a liquid composition used for forming a primer layer.

(e) A copolymer of dimethylaminoethyl methacrylate and 2-hydroxyethyl methacrylate was synthesized by the same method as in (c) above. Then, 943 parts of an ethyl Cellosolve solution containing a small amount of a flow control agent was mixed to form a liquid composition used to form a primer layer.

(f) A mixture of 20 parts of glycidyl methacrylate, 80 parts of 2-hydroxyethyl methacrylate, 230 parts of ethyl Cellosolve and 0.4 part of azobisisobutyronitrile was stirred at 90° C. for 4 hours in an atmosphere of nitrogen to copolymerize the monomers. Then, 1094.7 parts of ethyl Cellosolve containing a small amount of dimethylaminopropylamine and a small amount of a flow control agent were added to prepare a liquid composition for forming a primer layer.

EXAMPLE 2

Preparation of a liquid composition for forming a hard-coated layer (C):

(a) 944.4 parts of gamma-glycidoxypropyltrimethoxysilane, 835.2 parts of colloidal silica (Snowtex C, a product of Nissan Chemical Industry, Co., Ltd.; solids content 20) and 8.0 parts of 2N hydrochloric acid were mixed. The mixture was refluxed at 80° C. for 5 hours, and 168 parts of the solvent was evaporated at a temperature of 80° to 90° C. The solution contained 41of hydrolyzed gamma-glycidoxypropyltrimethoxysilane calculated as

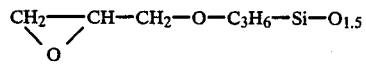

and 10of colloidal silica calculated as $SiO_2$

Ethyl Cellosolve (149 parts), 0.75 part of ammonium perchlorate and a small amount of a flow control agent were added to 140 parts of the resulting solution of the hydrolyzed gamma-glycidoxypropyltrimethoxysilane containing colloidal silica to form a liquid composition for forming a hard coat layer.

(b) 141 parts of gamma-glycidoxypropyltrimethoxysilane, 122 parts of methyltrimethoxysilane, 200 parts of colloidal silica (Snowtex C, a product of Nissan Chemical; solids content 20) and 190 parts of 0.1N aqueous solution of hydrochloric acid were mixed, and refluxed at 80° to 85° C. for 2 hours to perform hydrolysis.

The resulting solution contained 15.3of the hydrolyzed gamma-glycidoxypropyltrimetoxysilane calculated as

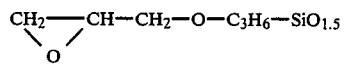

9.2of methyltrimethoxysilane calculated as $CH_3SiO_{1.5}$ and 6.1% of colloidal calculated as $SiO_2$.

To 100 parts of the resulting hydrolyzed terpolymer solution were added 0.31 part of ammonium perchlorate, a small amount of a flow control agent and 81.4 parts of ethyl Cellosolve to prepare a liquid composition for forming a hard coat layer.

(c) Six parts of gamma-glycidoxypropyltrimethoxysilane, 173 parts of methyltrimethoxysilane, 71 parts of colloidal silica (Snowtex C, a product of Nissan Chemical; solids content 20(%) and 190 parts of a 0.1N aqueous solution of acetic acid were mixed, and refluxed at 80° to 85° C. for 2 hours to perform hydrolysis.

The resulting solution contained 8.6of hydrolyzed gamma-glycidoxypropyltrimethoxysilane calculated as

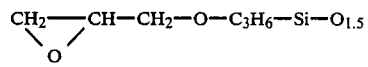

17.3% of hydrolyzed methyltrimethoxysilane calculated as $CH_3SiO_{1.5}$ and 2.9% of colloidal silica calculated as $SiO_2$.

To 450 parts of the resulting hydrolyzed terpolymer solution were added 42 parts of ethyl Cellosolve, 0.8 parts of ammonium perchlorate, 0.5 part of ammonium chloride, 1.3 parts of sodium acetate, and a small amount of a flow control agent to prepare a liquid composition for forming a hard-coated layer.

EXAMPLE 3

Production of a hard-coated polyester sheet:

In each run, each of the liquid compositions prepared in Example 1 for primer formation was coated on one surface of a cleaned transparent polyester sheet (thickness 125 micrometers; Lumilar made by Toray Inc.) and baked at 130° C. for 15 minutes in a hot air drying furnace to form a primer layer having a thickness of about 0.7 micrometer.

Then, each of the liquid compositions prepared in Example 2 for hard coat layer formation was coated on the primary layer, and baked at 150° C. for 60 minutes in a hot air drying furnace to form a hard-coated layer having a thickness of about 3 micrometers to prepare a polyethylene terephthalate laminate.

The combination of the primer layer and the hard coat layer and the results are shown in Table 1.

TABLE 1

| | Combination | | Initial properties | | Hot water resistance | |
|---|---|---|---|---|---|---|
| Polyester laminate No. | Primer layer | Hard-coated layer | Hardness | Adhesion | Hardness | Adhesion |
| Example 3 No. 1 | a | a | A | 100 | A | 100 |
| No. 2 | " | b | " | " | " | " |
| No. 3 | " | c | " | " | " | " |
| No. 4 | b | a | " | " | " | " |
| No. 5 | " | b | " | " | " | " |
| No. 6 | " | c | " | " | " | " |
| No. 7 | c | a | " | " | " | " |
| No. 8 | " | b | " | " | " | " |
| No. 9 | " | c | " | " | " | " |
| No. 10 | f | b | " | 90 | B | 30 |
| Control No. 1 | d | a | A | 50 | B | 0 |
| No. 2 | " | b | " | 80 | " | " |
| No. 3 | " | c | " | " | A | 30 |
| No. 4 | e | a | " | 40 | B | 0 |
| No. 5 | " | b | " | 20 | " | " |
| No. 6 | " | c | " | " | " | " |

The weatherabilities and flexural properties of the polyester laminates Nos. 1, 2 and 3 were tested and the results are shown in Table 2.

TABLE 2

| Laminate No. | Weatherability | | Flexural property |
|---|---|---|---|
| | Irradiation time (hours) | Appearance | |
| 1 | 400 | Acceptable | 3 mm |
| | 1200 | Cracks formed | |

TABLE 2-continued

| Laminate No. | Weatherability | | Flexural property |
|---|---|---|---|
| | Irradiation time (hours) | Appearance | |
| 2 | 400 | Acceptable | 4 mm |
| | 1200 | Acceptable | |
| 3 | 400 | Acceptable | 8 mm |
| | 1200 | Acceptable | |

EXAMPLE 4

Preparation of polyurethane resin compositions:

(a) One hundred parts of biuret of 1,6-hexane diisocyanate containing about 21 to 22% of free NCO groups and 100 parts of polyoxytetramethylene glycol containing about 5 to 6% of free OH groups were mixed, and the mixture was uniformly mixed with small amounts of 2,6-di(tert-butyl)-4-methylphenol as an antioxidant and dibutyltin dilaurate as a catalyst. The mixture was placed under reduced pressure to remove bubbles. (b) One hundred parts of polyester diol containing about 1.5 to 2of free OH groups, 32 parts of 1,6,11-undecane-triisocynate, 2.6 parts by weight of 3,9-bis(1,1-dimethyl-2-hydroxyethyl)-2,4,8,10-tetra-oxaspiro[6,5]-undecane, 3.8 parts by weight of 1,4-butanediol and a small amount of dibutyltin dilaurate as a catalyst were uniformly mixed and then defoamed.

(c) One hundred and fifty parts of a caprolactone-based diol containing about 1.5 to 2% of free OH groups, 61 parts of cyclohexane-1,4-diisocyanate and a small amount of dibutyltin dilaurate were reacted, and 26 parts of 1,4-butanediol was mixed with the reaction product. The mixture was defoamed.

(d) One hundred parts of polyoxytetramethylene glycol containing about 5 to 6of free OH groups, 20 parts of isophorone diisocynate and a small amount of dibutyltin dilaurate were mixed and reacted (package A).

A mixture of triethylamine, methyldiethanolamine and triethanolamine was prepared (package B).

(e) Four hundred parts of polyoxytetramethylene glycol containing about 1 to 2% of free OH groups was reacted with 74 parts of hexamethylene diisocyanate in the presence of a small amount of dibutyltin dilaurate. The reaction mixture was mixed with 60 parts of hydroxyethyl acrylate and aged. Then, the mixture was uniformly mixed with 40 parts of 2-ethylhexyl acrylate and small amounts of tetraethylene glycol diacrylate and benzophenone.

(f) Four hundred parts of polyoxytetramethylene glycol containing about 1 to 2% of free OH groups was reacted with 116 parts of 4,4'-methylenebis(cyclohexyl isocyanate) in the presence of a small amount of dibutyltin dilaurate. The reaction mixture was aged with 31 parts of allyl alcohol, and then further with 76 parts of trimethylolpropane tris(mercaptopropionate). The aged mixture was uniformly mixed with small amounts of hydroquinone monomethyl ether and benzoin methyl ether.

EXAMPLE 5

Production of polyurethane sheets:

(a) The polyurethane resin composition prepared in Example 4, (b) was cast into a mold coated with Teflon and cured to form a film having a thickness of 0.7 mm.

(b) The polyurethane resin composition prepared in Example 4, (c) was directly cured, crushed and processed on an extrusion roll to form a film having a thickness of 0.7 mm.

(c) The packages A and B prepared in Example 4, (d) were uniformly mixed. A spacer was provided around an aluminum plate coated with a mold releasing gent. The mixture was cast onto the aluminum plate and heat-treated to form a film having a thickness of 0.7 mm.

EXAMPLE 6

Production of laminated sheets of hard-coated polyester/polyurethane:

(a) The polyester laminate No. 1 produced in Example 3 was fixed to a stainless steel plate having a smooth surface with the hard-coated surface being kept in intimate contact with it. A spacer was provided around the stainless steel plate. The polyurethane resin composition prepared in Example, 4, (b) was cast onto the laminate, and a stainless steel plate coated with a silicone releasing agent was placed onto the cast composition. After the cast composition cured, the upper stainless steel plate was removed, and the polyester/polyurethane laminated sheet was taken out.

(b) The polyester laminate No. 2 produced in Example 3 was placed on a tempered glass plate with the hard-coated surface kept in contact with the glass plate. The polyurethane film prepared in Example 5, (b) was placed on it. A tempered glass plate coated with a silicone releasing agent was further placed on it. The assembly was put in a vacuum bag, and after evacuation, heated at 120 ° C. to effect press-bonding. The pressure was returned to atmospheric pressure, and the product was taken out from between the glass plates.

(c) The polyester laminate No. 3 produced in Example 3 was fixed to a stainless steel plate having a smooth surface with the hard-coated surface kept in intimate contact with it. A spacer was provided around it, and a uniform mixture of packages A and B prepared in Example 4, (d) was cast onto the laminate. A stainless steel plate coated with a releasing agent was placed on the cast mixture, and the assembly was heated. The upper and lower stainless steel plates were removed, and a polyester/polyurethane laminated structure was obtained.

EXAMPLE 7

Production of hard-coated polyester/shockabsorbing layer/glass laminated sheets:

(a) The polyester laminate No. 4 prepared in Example 3 was fixed to a stainless steel plate having a smooth surface with the hard-coated layer being kept in intimate contact with it. A spacer was provided around it, and the polyurethane resin composition prepared in Example 4, (a) was cast onto the surface of the laminate. A glass plate having a thickness of 3.0 mm was placed on the cast composition and pressed to the top of the spacer. The cast composition was allowed to cure. The stainless steel plate was removed. The finished polyester/polyurethane/glass laminated structure showed sufficient penetration resistance in a falling ball test.

(b) Example 7, (a) above was repeated except that the laminate No. 5 produced in Example 3 was used instead of the laminate No. 4, a tempered glass plate was used instead of the stainless steel plate, and the polyurethane resin composition prepared in Example 4, (b) was used instead of the polyurethane composition used in Example 7, (a). The resulting polyester/polyurethane/glass laminated structure showed sufficient penetration resistance in a falling ball test.

(c) Example 7, (b) above was repeated except that the laminate No. 6 produced in Example 3 was used instead position prepared in Example 4, (c) was used instead of the polyurethane composition used in Example 7, (b). The resulting polyester/polyurethane/glass laminated structure showed sufficient penetration resistance in a falling ball test.

(d) Example 7, (b) above was repeated except that the laminate No. 7 produced in Example 3 was used instead of the laminate No. 5, and a mixture of packages A and B prepared in Example 4, (d) was used instead of the polyurethane composition used in Example 7, (b). The resulting polyester/polyurethane/glass laminated structure showed sufficient penetration resistance in a falling ball test.

(e) The polyester laminate No. 8 produced in Example 3 was fixed to a stainless steel plate having a smooth surface with the hard-coated surface being kept in intimate contact with it. A spacer was provided around it, and the polyurethane resin composition prepared in Example 4, (e) was cast onto the surface of the laminate. A glass plate was placed on the cast composition, and pressed to the top of the spacer. Light from a high-pressure mercury lamp was irradiated onto the assembly from the side of the glass plate for 10 minutes to cure the polyurethane composition. The stainless steel plate was removed to give a polyester/polyurethane/glass laminate. The laminate showed sufficient penetration resistance in a falling ball test.

(f) Example 7, (e) was repeated except that the polyester laminate produced in Example 3 was used instead of the laminate No. 8, and the polyurethane resin composition prepared in Example 4, (f) was used instead of the polyurethane resin composition used in Example 7, (e). The resulting polyester/polyurethane/glass laminated structure showed sufficient penetration resistance in a falling ball test.

(g) The polyester laminate No. 4 produced in Example 3 was placed on a tempered glass plate with the hard-coated layer being kept in intimate contact with it. The polyurethane film prepared in Example 5, (a) was placed on it, and a glass plate having a thickness of 3.0 mm was placed on the film. The assembly was put in a vacuum bag, and heated to 120 °C. under reduced pressure. It was put in an autoclave, and maintained at 150 °C. for 60 minutes while pressurizing the autoclave to 10 atmospheres from outside. After the temperature was returned to room temperature and the pressure, to atmospheric pressure, the bag was taken out from the autoclave, and the product was taken out from the bag. The tempered glass plate on the polyester film side was removed to produce a polyester/polyurethane/glass laminated structure. The laminated structure showed sufficient penetration resistance in a falling ball test.

(h) Example 7, (g) was repeated except that the laminate No. 5 produced in Example 3 was used instead of the laminate No. 4, and the polyurethane film prepared in Example 5, (b) was used instead of the polyurethane film prepared in Example 5, (a). The resulting polyester/polyurethane/glass laminated structure showed sufficient penetration resistance in a falling ball test.

(i) Example 7, (g) was repeated except that laminate No. 6 produced in Example 3 was used instead of the laminate No. 4, and the polyurethane film prepared in Example 5, (c) was used instead of the polyurethane film prepared in Example 5, (a). The resulting polyester/polyurethane/glass laminated structure showed sufficient penetration resistance in a falling ball test.

(j) The polyester/polyurethane laminated sheet produced in Example 6, (a) was placed on a tempered glass plate with the hard-coated layer of the polyester being kept in intimate contact with the tempered glass plate. A glass plate having the same shape as the tempered glass was placed on the laminated sheet. The assembly was put in a vacuum bag, and heated to 120° C. under reduced pressure. The bag containing the assembly was directly put in an autoclave and heated to 150° C. while pressurizing the autoclave to 10 kg/cm$^2$ from outside. After the assembly was maintained under these conditions for 60 minutes, the temperature was returned to room temperature and the pressure, to atmospheric pressure. The product was withdrawn from the bag, and the tempered glass plate on the polyester side was removed. The resulting polyester/polyurethane/glass laminated structure showed sufficient penetration resistance.

(k) Example 7, (j) was repeated except that the polyester/polyurethane laminated sheet produced in Example 6, (b) was used instead of the laminated sheet used in Example 7, (j). The resulting laminated structure showed sufficient penetration resistance.

(l) Example 7, (k) was repeated except that the polyester/polyurethane laminated sheet produced in Example 6, (c) was used instead of the laminated sheet used in Example 7, (k). The resulting laminated structure showed sufficient penetration resistance.

(m) Example 7, (g) was repeated except that polyester/polyurethane laminated sheets Nos. 1 to 9 produced in Example 3 were used instead of the laminated sheet used in Example 7, (g), and a polyvinyl butyral film having a thickness of 0.7 mm was used instead of the polyurethane. The resulting nine laminated structures showed sufficient penetration resistance.

We claim:
1. A laminated structure composed of
   (A) a layer comprising a polyester resin,
   (B) a layer comprising a cured (meth)acrylate polymer containing an epoxy group in the molecule, which is a copolymer of
      (i) 1 to 100 mole % of an ester of an aliphatic alcohol having 1 to 6 carbon atoms and an epoxy group in the molecule, and (meth)acrylic acid, and
      (ii) 99 to 0 mole % of an ester of an aliphatic alcohol having no epoxy group in the molecule and having 1 to 6 carbon atoms which may optionally have a substituent, and (meth)acrylic acid, and
   (C) a layer comprising a cured organopolysiloxane compound and optionally particles of an inorganic compound, wherein the organopolysiloxane compound is a hydrolyzed and condensed product of a silicon compound represented by the formula

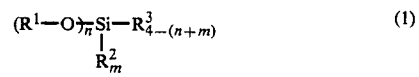

wherein $R^1$ represents an alkyl or alkoxyalkyl group having 1 to 6 carbon atoms, $R^2$ represents an alkyl group having 1 to 6 carbon atoms, $R^3$ represents an alkyl group having 1 to 6 carbon atoms or a cycloalkyl group having 3 to 6 carbon atoms which may optionally be substituted by a substituent selected from the group consisting of an epoxy group, a glycidyloxy group a (meth)acryloyl group, a vinyl group, an allyl group, a mercapto group, an epoxy-substituted cycloalkyl group, a halogen atom, an amino group and an amide group, n is 2, 3 or 4, and m is 0 or 1, provided that n+m≦4; or a mixture of at least two of said hydrolyzed and condensed products, the layers (A), (B) and (C) being laminated in this sequence.

2. The laminated structure of claim 1 in which the ester (i) is glycidyl (meth)acrylate.

3. The laminated structure of claim 1 in which the aliphatic alcohol having no epoxy group in the molecule and having 1 to 6 carbon atom which may optionally have a substituent is a hydroxyl-substituted aliphatic alcohol having 1 to 6 carbon atoms.

4. The laminated structure of claim 1 in which the (meth)acrylate polymer having epoxy groups in the molecule is a copolymer of
(i) an ester of an aliphatic alcohol having 1 to 6 carbon atoms and an epoxy group in the molecule and (meth)acrylic acid, and
(ii) an ester of a hydroxyl-substituted aliphatic alcohol having 1 to 6 carbon atoms and (meth)acrylic acid.

5. The laminated structure of claim 1 in which the organopolysiloxane compound is a mixture at least two of said hydrolyzed and condensed products of the silicon compounds of formula (1).

6. The laminated structure of claim 5 in which the silicon compound of formula (1) is selected from the group consisting of gamma-glycidoxypropyltrialkoxysilanes, gamma-glycidoxypropylmethyldialkoxysilanes, tetramethoxysilane, tetraethoxysilane, tetrapropoxysilane, alkyltrialkoxysilanes, dialkyldialkoxysilanes and 2-(3,4-epoxycyclohexyl)ethyl trialkoxysilanes.

7. The laminated structure of claim 1 or 5 in which at least one silicon compound of formula (1) is a glycidoxyalkyltrialkoxysilane in which the alkyl moiety and the alkoxy moiety each have 1 to 4 carbon atoms.

8. The laminated structure of claim 7 in which the organopolysiloxane compound is a mixture of
(i) 5 to 99% by weight of a hydrolyzed and condensed product of a glycidoxyalkyltrialkoxysilane in which the alkyl moiety and the alkoxy moiety each have 1 to 4 carbon atoms, and
(ii) 95 to 1% by weight of a hydrolyzed and condensed alkyltrialkoxysilane in which the alkyl moiety and the alkoxy moiety each have 1 to 4 carbon atoms.

9. The laminated structure of claim 1 or 5 in which at least one silicon compound of formula (1) is an alkyltrialkoxysilane in which the alkyl moiety and the alkoxy moiety each have 1 to 4 carbon atoms.

10. The laminated structure of claim 1 in which the layer comprising the cured organopolysiloxane compound further contains particles of an inorganic compound having an average particle diameter of 1 to 200 mm.

11. The laminated structure of claim 10 in which the inorganic compound is $SiO_2$, and the proportion of $SiO_2$ is 5 to 45% by weight based on the total weight of the organopolysiloxane compound and $SiO_2$.

12. A laminated structure composed of
(A) a layer comprising a polyester resin, (B) a layer comprising a cured polymer of a (meth)acrylic acid ester having an epoxy group in the molecule, which is a copolymer of
(i) 1 to 100 mole % of an ester of an aliphatic alcohol having 1 to 6 carbon atoms and an epoxy group in the molecule, and (meth)acrylic acid, and
(ii) 99 to 0 mole % of an ester of an aliphatic alcohol having no epoxy group in the molecule and having 1 to 6 carbon atoms which may optionally have a substituent and (meth)acrylic acid,
(C) a layer comprising a cured organopolysiloxane, wherein the organopolysiloxane compound is a hydrolyzed and condensed product of a silicon compound represented by the formula

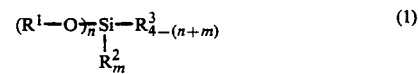

wherein $R^1$ represents an alkyl or alkoxyalkyl group having 1 to 6 carbon atoms, $R^2$ represents an alkyl group having 1 to 6 carbon atoms, $R^3$ represents an alkyl group having 1 to 6 carbon atoms or a cycloalkyl group having 3 to 6 carbon atoms which may optionally be substituted by a substituent selected from the group consisting of an epoxy group, a glycidyloxy group, a (meth)acryloyl group, a vinyl group, an alkyl group, a mercapto group, an epoxy-substituted cycloalkyl group, a halogen atom, an amino group and an amide group, n is 2, 3 or 4, and m is 0 or 1, provided that n+m≦4; or a mixture of at least two of said hydrolyzed and condensed products, and
(D) a shock-absorbing layer,
the layers (D), (A), (B) and (C) being laminated in this sequence.

13. The laminated structure of claim 12 in which the shock-absorbing layer is a layer of a polyvinyl butyral resin or a polyurethane resin.

14. A laminated structure composed of
(A) a layer comprising a polyester resin,
(B) a layer comprising a cured polymer of a (meth)acrylic acid ester having an epoxy group in the molecule, which is a copolymer of
(i) 1 to 100 mole % of an ester of an aliphatic alcohol having 1 to 6 carbon atoms and an epoxy group in the molecule, and (meth)acrylic acid, and
(ii) 99 to 0 mole % of an ester of an aliphatic alcohol having no epoxy group in the molecule and having 1 to 6 carbon atoms which may optionally have a substituent, and (meth)acrylic acid,
(C) a layer comprising a cured organopolysiloxane, wherein the organopolysiloxane compound is a hydrolyzed and condensed product of a silicon compound represented by the formula

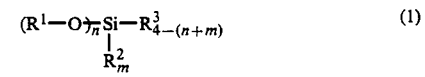

wherein $R^1$ represents an alkyl or alkoxyalkyl group having 1 to 6 carbon atoms, $R^2$ represents an alkyl group having 1 to 6 carbon atoms, $R^3$ represents an alkyl group having 1 to 6 carbon atoms or a cycloalkyl group having 3 to 6 carbon atoms which may optionally be substituted by a substituent selected from the group consisting of an epoxy group, a glycidyloxy group, a (meth)acryloyl group, a vinyl group, an allyl group, a mercapto group, an epoxy-substituted cycloalkyl group, a halogen atom, an amino group and an amine group, n is 2, 3 or 4, and m is 0 or 1, provided that $m+m \leqq 4$; or a mixture of at least two of said hydrolyzed and condensed products, (D) a shock-absorbing layer, and (E) a layer of glass,
the layers (E), (D), (A), (B) and (C) being laminated in this sequence.

15. The laminated structure of claim 14 in which the glass layer is a single glass sheet.

16. The laminated structure of claim 14 in which the glass layer is a laminated glass sheet.